US008614710B2

(12) United States Patent
Coffelt, Jr.

(10) Patent No.: US 8,614,710 B2
(45) Date of Patent: Dec. 24, 2013

(54) METHOD FOR DERIVING PIXEL COLOR USING STERADIANS

(76) Inventor: Louis Arthur Coffelt, Jr., Perris, CA (US)

( * ) Notice: Subject to any disclaimer, the term of this patent is extended or adjusted under 35 U.S.C. 154(b) by 101 days.

(21) Appl. No.: 13/199,201

(22) Filed: Aug. 22, 2011

(65) Prior Publication Data
US 2013/0050231 A1 Feb. 28, 2013

(51) Int. Cl.
*G06T 15/50* (2011.01)
(52) U.S. Cl.
USPC ............................................. 345/426
(58) Field of Classification Search
USPC ............................................. 345/426
See application file for complete search history.

(56) References Cited

U.S. PATENT DOCUMENTS

| 2004/0174360 A1* | 9/2004 | Deering et al. | 345/426 |
| 2008/0074418 A1* | 3/2008 | Shearer | 345/420 |

* cited by examiner

*Primary Examiner* — Aaron M Richer (57) ABSTRACT

The present invention includes a method for deriving a pixel color in a graphic image. e.g. electronic RGB 48 bpp bitmap. Methods of the present invention include mathematical structure analysis of geometric graphic objects. e.g. sphere, lines, plane, points, and characters. This analysis includes using a particular steradian region of space; and two position vectors located in the particular steradian region of space; and comparing the length of the position vectors; and deriving a pixel color from a result of the length comparison. The position vectors point to a point on the geometric graphic object. A vector having a least length has contact with a light source.

6 Claims, 4 Drawing Sheets

METHOD FOR DERIVING PIXEL COLOR USING STERADIANS

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING

Not Applicable

BACKGROUND OF THE INVENTION

Selecting pixel color in an electronic graphic image is attained by several prior art methods. One method may be to manually select a pixel color. For example, in a software program having a trademark "Photoshop", a group of pixels can be selected. Any color can be manually assigned to those pixels. e.g. in an RGB 48 bpp bitmap, a color red is: R=255, G=0, B=0, color white is: R=255, G=255, B=255, black is: R=0, G=0, B=0. Furthermore, in Photoshop, shadows can be created by setting a light source to particular coordinates. Shadows may have a color with low brightness. e.g. dark gray. In comparison, highlights may have a color with high brightness. e.g. bright blue or white. Highlights indicate that the light source contacts the surface. Shadows indicate that the light source does not contact the surface.

Determining whether a light source contacts a surface is a significant problem in the prior art. Prior methods are inherently limited to creating relatively simple shadows and highlights. For example, a shadow of a sphere on a flat surface. One prior art method to progromaticaly derive a pixel color may be to test a distance from particular elements in the bitmap. For example, if a pixel is less than 10 pixels from the selection, set the pixel color to dark gray.

Prior art methods essentially estimate whether a light source contacts a surface to create shadows and highlights. In the case of complex surfaces, the prior art does not calculate whether the light source contacts a particular surface. For example, in a mathematical model of planets Earth, Venus, Earths moon, and the Sun, the prior art does not calculate whether light rays from the Sun contact Earth, Earths moon, Saturn, or Venus.

In comparison, for example, the present invention calculates a location of each pixel in a complex geometric object; compares distance of points located in the same region of space; and determines whether light rays from the Sun contacts any planet. e.g. the present invention may calculate a solar eclipse of Earth on Venus at any location in their orbital path.

BRIEF SUMMARY OF THE INVENTION

The present invention comprises a method for deriving pixel color in graphic images. e.g. a RGB 48 bpp bitmap. Mathematical structure analysis of a complex geometrical object determines whether a light source contacts a surface on the complex object. This structural analysis includes using steradians. The analysis calculates a vector length for any two points located in the same steradian region of space. Next, these two vector lengths are compared. A vector having a least length has contact with the light source. A vector having greater length does not have contact with the light source. Next, a pixel color may be programaticaly selected accordingly. e.g. bright blue for a point having contact with the light source; or dark gray for a point not having contact with the light source. Furthermore, the present invention may be utilized to create translucent surfaces.

BRIEF DESCRIPTION OF THE SEVERAL VIEWS OF THE DRAWING

The present invention is further described with reference to the appended drawings where identical or corresponding parts are identified by the same reference character throughout the views of the drawing where:

FIG. 4 shows a side view of vector (6), vector (9), vector (11), vector (10), position vector (41), and azmith angle (13).

DETAILED DESCRIPTION OF THE INVENTION

The present invention comprises a method for deriving pixel color in graphic images. e.g. an RGB 48 bpp electronic bitmap. One method includes progromatic analysis of a geometric structure. Results of the analysis will indicate whether a light source contacts a particular point on the structure. For example, indicate that a particular point is a highlight or shadow. A pixel color can be assigned accordingly. e.g. bright blue for a highlight or dark gray for a shadow.

A fundamental element of the present invention includes a steradian. A steradian is a particular region of space with a boundary defined by four vectors. A geometric coordinate system is used to define a particular location of the steradian and vectors. e.g. a right-handed 3-dimensional Cartesian coordinate system. For example, the location of the steradian can be defined by a rotation angle, and an azmith angle. Vectors and coordinate systems are defined in the science of Physics. The geometric structure analysis described herein will be in accordance with the corresponding properties set forth in Physics. e.g. vector addition, vector dot product (cosine of angle between vectors), and coordinate systems.

The term "position vector" as used herein is a vector which has a particular direction and scalar length. For example, in a coordinate system having axes identified by characters j, k; the geometric point (3.0, 7.0, 1.0) is defined by a position vector $3.0i+7.0j+1.0k$ The following description of the present invention is set forth in a right-handed 3-dimensional Cartesian coordinate system with axes i, j, k as shown in the example above. For example, the vector cross-product i cross j equals k ($k=i \times j$).

A fundamental element of the present invention includes calculating a location of vectors, and length of vectors. For example, calculating a particular steradian for a position vector, and calculating an angle between vectors.

Figure 1:
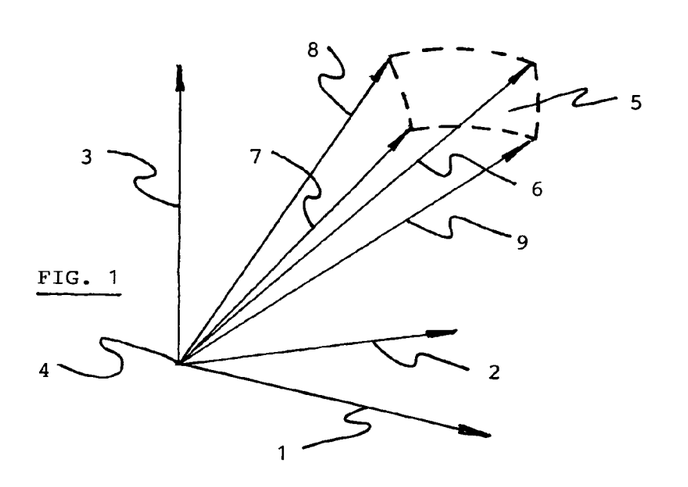
FIG. 1 is a perspective view of a steradian (5); and a 3-dimensional right-handed Cartesian coordinate system.

FIG. 1 shows a perspective view of a steradian (5) in a right-handed 3 dimensional Cartesian coordinate system. The coordinate system has an i axis (1), j axis (2), k axis (3), and origin (4). A boundary of steradian (5) is formed by vector (6), vector (7), vector (8), and vector (9). Steradian (5) is a region of space between these four boundary vectors, vector (6), vector (7), vector (8), and vector (9).

Figure 2:
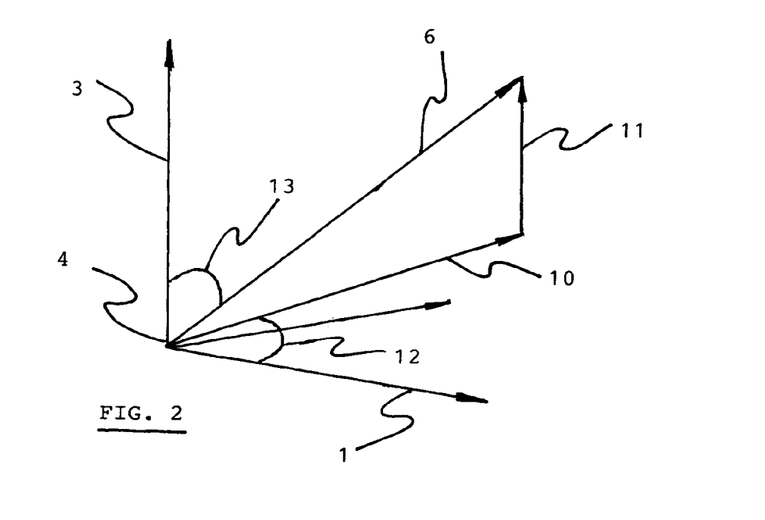
FIG. 2 is a perspective view of vector (6), a rotation an angle (12), and azmith angle (13).

FIG. 2 shows a perspective view of the coordinate system, and boundary vector (6). An azmith angle (13) is between vector (6) and the k axis. Boundary vector (6) is shown equal to a vector sum of vector (10) plus vector (11). Vector (10) is a projection of boundary vector (6) to the i-j axis plane. Vector (11) is parallel to the k axis. For example, vector (6) equals −7.0i+9.0j+11.2k Therefore, vector (10) equals −7.0i+9.0j+0.0k; and vector (11) equals 0.0i+0.0j+11.2k A rotation angle (12) defines a rotational location of steradian (5). Obviously, each boundary vector of steradian (5) will have a particular azmith angle and rotation angle.

Figure 3:
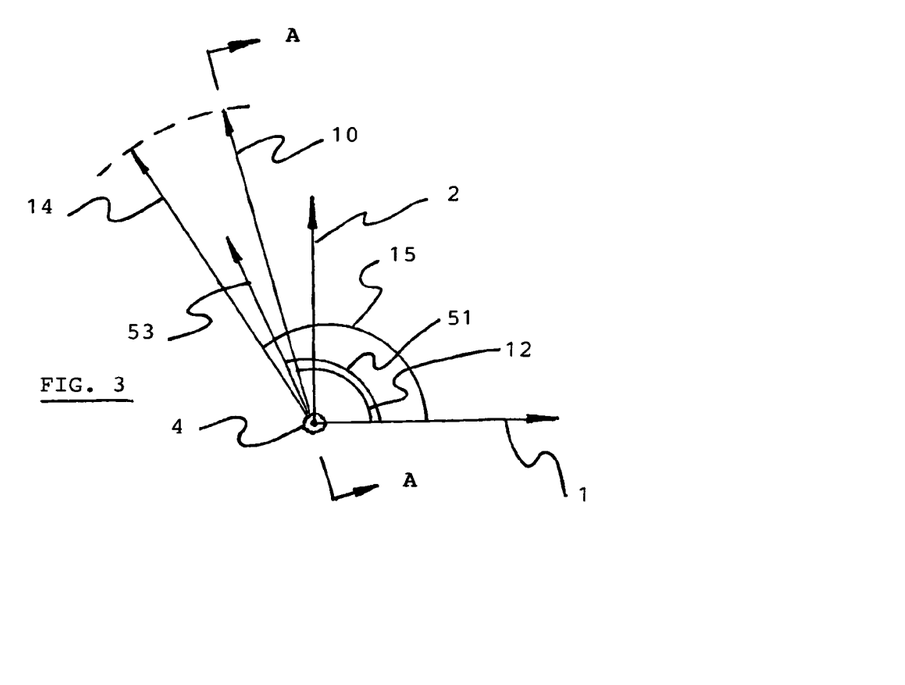
FIG. 3 is a top view of vector (10), vector (14), rotation angle (12), and position vector (41).

FIG. 3 is a top view of vector (10), rotation angle (12), rotation angle (15), rotation angle (51), vector (14), and vector (41). Vector (14) is a projection of vector (8) to the i-j axis plane. For example, vector (8) equals −8.0i+8.124j+11.2k Therefore, vector (14) equals −8.0i+8.124j+0.0k Rotation Rotation angle (15) is between vector (14) and the i axis. Rotation angle (12) and rotation angle (15) can be calculated using a vector dot product. The following illustrates the mathematical formula for the vector dot product where, (a) is a vector, (b) is a vector; lengtha is the scalar length of vector(a), lengthb is the scalar length of vector(b); ai is the i component of (a); aj is the j component of (a), ak is the k component of (a); bi is the i component of (b), bj is the j component of (b), bk is the k component of (b); theta equals the angle between vector (a) and vector(b):

$$\cos(\text{theta})=(ai*bi+aj*bj+ak*bk)/(\text{length}a*\text{length}b)$$

For example, vector (10) equals −7.0i+9.0j+0.0k; i axis equals 1.0i+0.0j+0.0k; length of vector (10) equals 11.402; length of i axis is 1.0; therefore, cos(theta) equals (−7.0*1.0+9.0*0.0+0.0*0.0)/(11.402*1.0); cos(theta)=−0.61394; theta=a cos(−0.61395); rotation angle (12) equals a cos(−0.61394); rotation angle (12) equals 2.2318 radians (127.87 degrees); vector (14) equals −8.0i+8.124j+0.0k; rotation angle (15) equals 2.3485 radians (134.56 degrees); vector (53) equals −7.33i+8.7333j+0.0k; rotation angle (51) equals 2.2690 radians (130 degrees); this example shows that vector (53) is located between vector (10) and vector (14).

Figure 4:
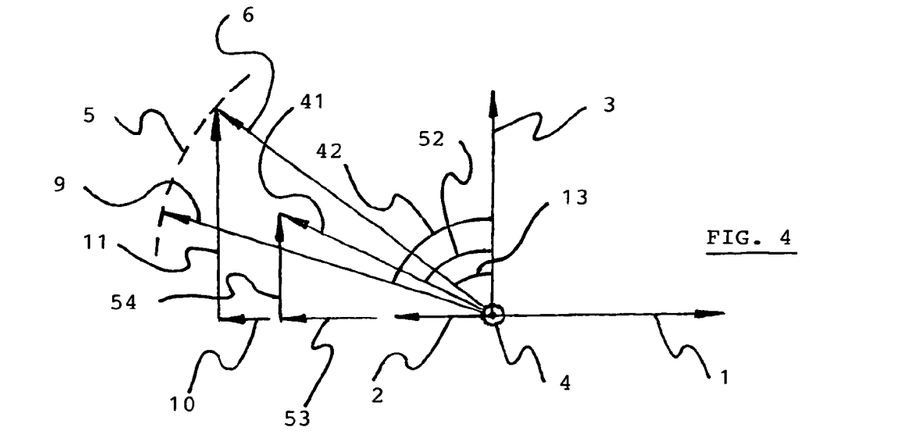
FIG. 4 is a sectional view A-A from FIG. 3.

FIG. 4 is a sectional side view A-A of vector (6), vector (9), vector (41), vector (53), vector (54), azmith angle (13), azmith angle (42), and azmith angle (52). Calculations of these azmith angles will show that vector (41) is located between vector (6) and vector (9). The example above shows a method for calculating the location of a vector. The location of vector (41) may be derived by similar calculations in the example above. Vector (41) equals the vector sum of vector (53) plus vector (54). Vector (53) is in the i-j plane. Vector (54) is parallel to the k axis.

For example, azmith angle (42) equals 0.24192 radians (13.861 degrees); azmith angle (13) equals 0.17365 radians (9.949 degrees); azmith angle (52) equals 0.20791 radians (11.912 degrees); therefore, vector (41) is located between vector (6) and vector (9).

The description of FIG. 1, FIG. 2, FIG. 3, and FIG. 4 illustrates a method to derive a mathematical relationship between a particular position vector and a particular steradian. For example, determine whether a particular position vector is located in a particular steradian. Furthermore, determine whether two position vectors are both located in one particular steradian.

The rotation angles and azmith angles are relatively greater that typical angle values used for computer graphics. For example, the angle between vector (10) and vector (14) above is 0.1167 radians. An angle between vector (10) and vector (14) for a computer graphic image may be about 0.001 radians. The methods set forth herein are also utilized to calculate vector locations and steradian parameters for these relatively small angles.

Figure 5:
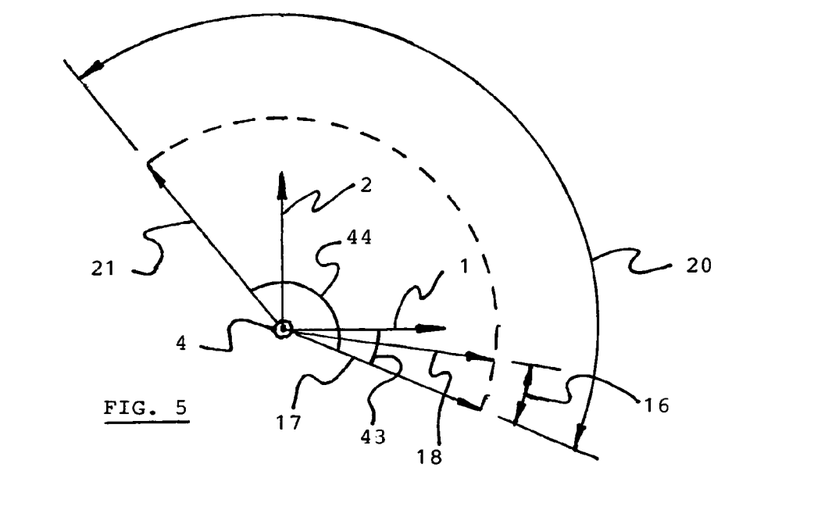
FIG. 5 is a top view of adjacent steradians (16).

FIG. 5 shows a top view of adjacent steradians (16). FIG. 5 also shows a boundary of the steradians. The steradians are located between an initial side vector (17) and a terminal side vector (21). A terminal side vector (18) of steradian (16) is located between vector (17) and vector (21). Vector (17), vector (18), vector (21), i axis, and j axis are all co-planar. Rotation angle (43) defines a location of vector (17) relative to the i axis. A rotation angle (44) defines an angle between vector (17) and vector (21). FIG. 5 also shows an arc (20) between vector (17) and vector (21). Obviously, the steradians may be located in any selected region of space. Therefore, angle (43) and angle (44) may have any selected value between 0.0 to 2 pi radians (360 degrees).

FIG. 5 also shows that vector (17), vector (18), and vector (21) each have one particular length. For example, for a length equal to 17 inches, the vectors may have the following values: vector (17) equals 15.762i−6.3683+0.0k; vector (18) equals 16.074i−5.5346j+0.0k; vector (21) equals −11.594i+12.433j+0.0k; rotation angle (43) equals −0.38397 radians (−22 degrees); rotation angle (44) equals 2.2705 radians (155.0 degrees); length of arc (20) equals 38.598 inches; An arc length for a steradian may be approximately 0.001 inches; therefore, in this example, the total steradians between vector (17 and vector (21) equals total arc length/steradian arc length (38.598/0.001); therefore, total steradians between vector (17) and vector (21) equals 38598. The steradian arc length may typically be commensurate with the resolution of a computer monitor. e.g. 1000 pixels per inch is equivalent to 0.001 inches per steradian arc; 1500 pixels per inch is equivalent to 0.0006 inches per steradian arc.

The steradians (16) in FIG. 5 can be identified with an index. In a zero based index system, the first steradian has an index of 0(zero). For example, in the case described above, there are a total of 38598 steradians. Therefore, indexes for these steradians are 0 thru 38597. These indexes may be assigned a title corresponding to the orientation of the steradians. For example, a steradian column index or steradian row index. Therefore, the steradians in FIG. 5 may be referred to as steradian column 0 thru steradian column 38597.

Figure 6:
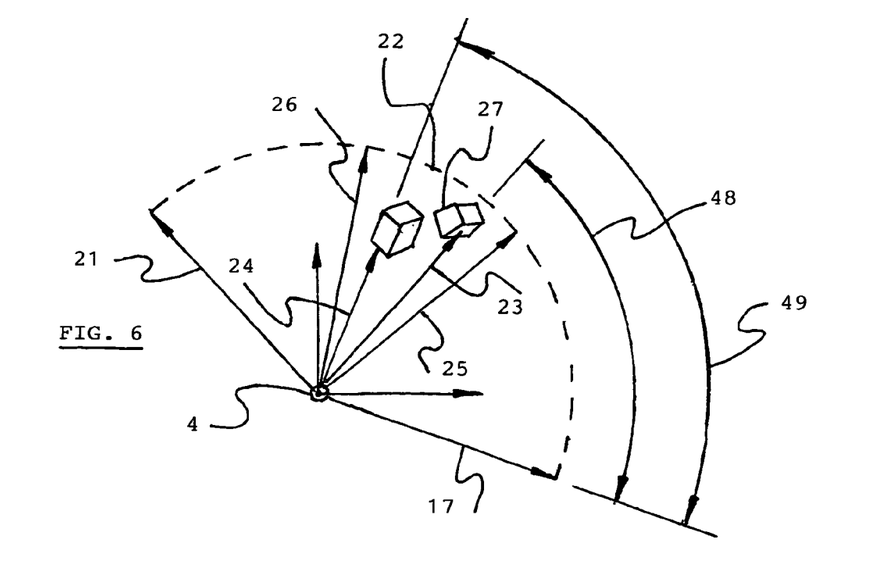
FIG. 6 is a top view of one particular steradian (22), a position vector (23), and a position vector (24).

FIG. 6 shows a top view of a steradian (22), a graphic object (27), a position vector (23), and a position vector (24) each located between vector (17) and vector (21). Vector (25) and vector (26) is a boundary of steradian (22). Therefore, the graphic object (27) is located between vector (25) and vector (26). The graphic object (27) may be any selected mathematical model of any geometric structure. For example, a general form of a line is: j=m*i+b where m is the slope of the line, i is the range coordinate, b is the j axis intercept, and j is the domain coordinate. Therefore, graphic object (27) is: "j=m*i+b"; and a point on this object (27) is the terminal end of a vector (23). Position vector (23) points to graphic object (27). For example, for any non-zero value of m and b, 6.7=m*3.3+b, therefore, a position vector (23) is located between vector (25) and vector (26); a position vector (23) equals 3.3i+6.7j+0.0k for example, a particular point on graphic object (27) is 6.7=−1.2*3.3+10.66; therefore, position vector (23) equals 3.3i+6.7j+0.0k; m=−1.2; b=10.66; Therefore, the graphic object point (3.3, 6.7, 0.0) will be tested to determine whether a light source contacts this point.

The structure analysis comprises: a.) calculating a particular position vector (23) and a particular position vector (24); b.) calculating the length of position vector (23) and the length of position vector (24); c.) comparing the length of position vector (23) to the length of position vector (24); d.) declaring a point light source is located at the origin of the coordinate system; e.) deriving a pixel color from a result of the length comparison. A position vector having less length will have contact with the light source. for example, length of position vector (23) equals 55.78 inches, and length of position vector (24) equals 55.92; therefore, the point at position vector (23) has contact with the light source; position vector (23) equals 3.3i+6.7j+0.0k; position vector (24) equals 3.218i+6.75j+0.0k; point (3.3, 6.7, 0.0) contacts the light source; point (3.218, 6.75, 0.0) does not contact the light source. point (3.3, 6.7, 0.0) is a highlight point; point (3.218, 6.75, 0.0) is a shadow point.

Obviously, the mathematical calculations set forth herein may be executed by various computer programming languages. e.g. c# or c++ To further clarify the meaning of the present invention, c++ code snippets are set forth in the following description. These c++ code snippets may not show some declations. These declarations are obvious. A typical character in c++ programming is the left brace, and right brace. The brace character is not available. Therefore, a substitute characters <[, and ]> is used herein. For example, the c++ code: double dx=0.0; is not enclosed by any brace; and the c++ code: <[double dz=3.3; ]> is enclosed by a left brace and a right brace. The declation of dz above is enclosed by a left brace and a right brace (substitute character).

These c++ code snippets will have the following format: c++<[C++ lines of code . . . ]> The following c++ code snippet shows a method to execute steps a.) thru e.) above:

c++ <[spi=0.0; spj=0.0; spk=0.0; ptai=3.3; b=10.66; ptak=0.0; ptaj=m0*ptai+b; ptbi=3.218; ptbj=17.33*ptbi+2.476; ptbk=0.0; lengtha=sqrt(ptai*ptai+ptaj*ptaj+ptak*ptak); lengthb=sqrt(ptbi*ptbi+ptbj*ptbj+ptbk*ptbk); if(lengtha<lengthb)<[sourcecontactA=true; red=250; green=0; blue=0; row=11; column=13; bitmapxx.SetPixel (row, column, red, green, blue); ]> else <[sourcecontactA=false; red=10; green=10; blue=10; row=11; column=13; bitmapxx.SetPixel(row, column, red, green, blue); ]>]>

In the c++ code snippet example above, spi, spj, spk is the source point; ptai, ptaj, ptak is position vector (23); ptbi, ptbj, ptbk is position vector (24); lengtha is the length of position vector (23); lengthb is the length of position vector (24); if(lengtha<lengthb) is the length comparison of position vectors; a 'true' result for the comparison derives the pixel color is red; a 'false' result for the comparison derives the pixel color is gray.

The c++ code snippet above assigns 11 to row, and 13 to column. This row and column assignment is simplified to focus on the primary objective of the example, which is: light source contacts a point, or light source does not contact a point.

FIG. 6 also shows an arc (48), an arc (49), a rotation angle (43), a rotation angle (45), and a rotation angle (46). Graphic objects may typically have numerous points which will be programaticaly compared. Furthermore, there may be many graphic object points located in one particular steradian. Therefore, the lengths of position vectors can be saved during runtime. This provides that any two position vectors can be compared as required. One method for saving the length of position vectors is utilizing a c++ array or vector. e.g. c++ <[std::vector<double> positionlength(totalpixels, 1000000000.0); ]>

One method to execute the graphic object structure analysis is set forth below in a c++ code snippet. This example sets forth a method for row and column calculations. Also, sets forth a method for saving position vector lengths during runtime. The following is a summary of the c++ code snippet below:

'positionlength' is a c++ <vector> having a size equal to the total pixels in the bitmap; The code first iterates thru each point on a first line; calculate the length of the current position vector; calculate the rotation angle between position vector (23) and vector (17); calculate the steradian column index; steradian row index is constant to focus on primary objective; read prior position vector length; compare current length to prior length; if the current length is less than the prior length: save the current length in <vector> 'positionlength'; in this first iteration, all values in 'positionlength' <vector> are initialized to a very large value, e.g. 1000000000.0; this this large value ensures that all points in the first length comparison will be entered into the 'positionlength' <vector>; second, iterate thru each point on a second line; repeat same steps above; At this point in runtime, 'positionlenth' <vector> will contain only lengths having the least length (points having contact with the light source); third, iterate thru each point on the first line; calculate the length of the current position vector (23); calculate the rotation angle (45) between the position vector (23) and vector (17); calculate the steradian column index; read the prior position vector length; compare the current length to the prior length; calculate the difference between current length and prior length; test if the difference is less than 0.0001; if test result is true: the current point has contact with the light source; assign a pixel color accordingly; set pixel color in the bitmap; This difference of length is used to determine whether the current point is the same as the prior point; fourth, iterate thru each point on the second line; calculate length of the current position vector (24); calculate the rotation angle (46) between position vector (24) and vector (17); calculate the steradian column index; read the prior position vector length; calculate the difference between the current length and the prior length; test if the difference is less than 0.0001; if test result is 'true': the current point has contact with the light source; else, the current point does not have contact with the light source; assign a pixel color accordingly; set pixel color in the bitmap.

c++ <[std::vector<double> positionlenth(1000, 1000000000.0); row=0; length17=22.23; inchesPerSteradian=0.001; ptai=0.0; ptak=0.0; ptbi=0.0; ptbk=0.0; while (count0<1000)<[ptaj=−2.2*ptai+4.1; currentlength=sqrt (pati*ptai+ptaj*ptaj+ptak*ptak); vector17i=cos(−0.589); vector17j=sin(−0.589); vector17k=0.0; adotb=(ptai* vector17i+ptaj*vector17j+ptak*vector17k)/(currentlength* length17); theta=a cos(adotb); arc48=length17*theta; steradian indexD=arc48/inchesPerSteradian; steradianindex=unsigned int(steradianIndexD); priorlength=positionlength[steradianindex]; if(currentlength<priorlength)<[positionlength<[steradianindex]=currentlength; ]>ptai+=0.001; count0++; ]> while (count1<800)<[ptbj=3.3*ptbi+2.7; currentlength=sqrt (ptbi*ptbi+ptbj*ptbj+ptbk*ptbk); adotb=(ptbi* vector17i+ptbj*vector17j+ptbk*vector17k)/(currentlength* length17); theta=a cos(adotb); arc49=length17*theta; steradianindexD=arc49/inchesPerSteradian; steradianindex=unsigned int(steradianindexD); priorlength=positionlength[steradianindex]; if(currentlength<priorlength)<[positionlength [steradianindex]=currentlength; ]> ptbi+=0.001; count1++; ]> while (count2<1000)<[ptaj=-2.2*ptai+4.1; currentlength=sqrt (ptai*ptai+ptaj*ptaj+ptak*ptak); adotb=(ptai* vector17i+ ptaj*vector17j+ptak*vector17k)/(currentlength* length17); theta=a cos(adotb); arc48=length17*theta; steradianindexD=arc48/inchesPerSteradian; steradianindex=unsigned int(steradianindexD); priorlength=positionlength[steradianindex]; testdiff=abs (currentlength−priorlength); if(testdiff<0.0001)< [sourcecontactsurface=true; red=240; green=0; blue=0; bitmapx.SetPixel(row, steradianindex, red, green,blue)]>; else< [sourcecontactsurface=false; red=11; green=22; blue=8; bitmapx.SetPixel(row, steradianindex, red, green, blue); ]> ptai+=0.001; count2++; ]> while(count3<800)< [ptbj=3.3*ptbi+2.7; currentlength=sqrt(ptbi*ptbi ptbj*ptbj+ ptbk*ptbk); adotb=(ptbi*vector17i+ptbj* vector17j+ ptbk*vector17k)/(currentlength*length17); theta=a cos (adotb); arc49=lenght17*theta; steradianindexD=arc49/ inchesPerSteradian; steradianindex=unsigned int (steradianindexD); priorlength=positionlength [steradianindex]; testdiff=abs(currentlength−priorlength);if (testdiff<0.0001)<[sourcecontactsurface=true; red=240; green=0; blue=0; bitmapx.SetPixel(row, steradianindex, red, green, blue); ]> else<[sourcecontactsurface=false; red=11; green=22; blue=8; bitmapx.SetPixel(row, steradianindex, red, green, blue); ]> ptbi+=0.001; count3++; ]>

The c++ code snippet above will display a horizontal red line on a computer monitor. The c++ code snippet above is set forth to show a method to derive whether a light source contacts any particular point in a graphic object. The example above does not determine whether a point is 'visible'. The following description shows a method to calculate appropriate row and column indexes for the bitmap pixels. These calculations for bitmap row and column index may be used in conjunction with the above c++ code snippet examples. The following description will also show a method to determine whether a particular point is 'visible'.

Figure 7:
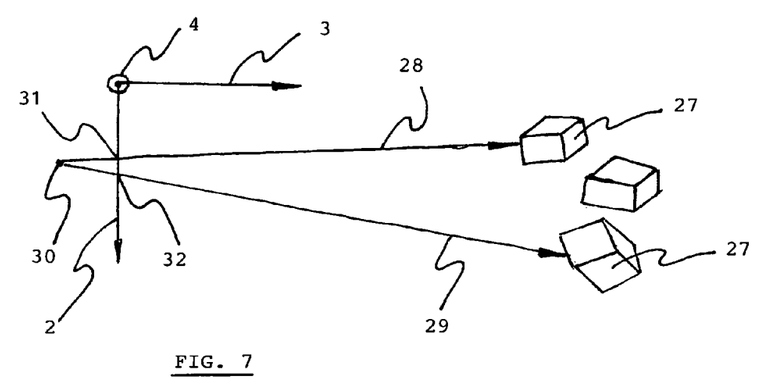
FIG. 7 is a side view of a vector (28) and a vector (29) intersecting the i-j plane of the coordinate system.

For example, FIG. 7 shows the origin (4) of the coordinate system, point (0.0, 0.0, 0.0), and the i axis (1). The i axis vector (1) points toward an observer viewing the page of the drawing. The terminal end of i axis vector is point (1.0, 0.0, 0.0). This point (1.0, 0.0, 0.0) is 'visible' in FIG. 7; and point (0.0, 0.0, 0.0) is Not 'visible' in FIG. 7. This concept of 'visible' is similar to calculations in regard to a light source contacting a surface. Vectors having a least length are 'visible'. Vectors having a greater length are not 'visible'.

FIG. 7 shows a side view of a vector (28), a vector (29) and a view point (30) in the coordinate system. A terminal end of vector (28) is on a first graphic object (27). The tail end of vector (28) is on view point (30). The terminal end of vector (29) is on a second graphic object (27). The tail end of vector (29) is on view point (30).

FIG. 7 also shows an intersection point (31), and intersection point (32). Vector (28) intersects the i-j plane at point (31). Vector (29) intersects the i-j plane at point (32).

The following is a summary of steps to derive 'visible' pixels on a graphic object, and derive bitmap row and column index values:

a.) Declare a c++<vector> lengthy, initialize all values to 1000000000.0; b.) Declare a bitmap pixel height, and pixel width; c.) Declare pixel per inch value for the bitmap; d.) Calculate width and height of the bitmap in inches; e.) Declare coordinates of a view point (30); f.) Iterate thru all points in a first graphic object (27); g.) Calculate a vector (28); h.) Intersect vector (28) with the i-j plane; i.) Test if Intersection point (31) is located within boundary of the bitmap width and height; j.) If 'true' result: calculate bitmap row and column index; k.) Read prior length; l.) calculate current length of the current vector (28); m.) Compare current length to prior length; if current length is less than prior length: save current length value in lengthy <vector>; n.) Increment to next pixel in first graphic object (27); repeat steps g.) thru n.) above; 0.) Iterate thru all points in a second graphic object (27); p.) Execute steps g.) thru n.) above for a vector (29) and intersection point (32); lengthy <vector> now contains only points which are 'visible'; q.) Iterate thru all points in the first graphic object (27); Calculate a vector (28); Intersect vector (28) with i-j plane; r.) Test if intersection point (31) is located within boundary of bitmap width and height; s.) if 'true': calculate bitmap row and column index; t.) Read prior length; u.) calculate current length; v.) Calculate difference between current length and prior length; w.) Test difference in length is less that 0.0001; if 'true': current point is 'visible'; x.) Increment to next point if first graphic object; y.) Repeat steps q.) thru x.) above; z.) Iterate thru all points in the second graphic object (27); Execute steps q.) thru y.) above; If source contacts the surface and the point is 'visible': set pixel color to highlight, else, set pixel color to shadow. In these c++ examples, '<vector>positionlength' contains values pertaining to a light source contacts a surface; and '<vector> lengthy' contains values pertaining to deriving a 'visible' point.

The c++ boolean character for 'or' is not available. Therefore, the word 'or' is used herein as a substitute character for the boolean character.

c++ <[std::vector<double> lengthv(2520000, 1000000000.0); double bitmapHeightInches=0.0; double bitmapWidthInches=0.0; unsigned int bitmapPixelHeight=1400; unsigned int bitmapPixelWidth=1800; double bitmapPixelHeightD 1400.0; double bitmapPixelWidthD=1800.0; unsigned int pixelsPerInch=1000; double pixelsPerInchD=double(pixelsPerInch); bitmapHeightInches=bitmapPixelHeightD/pixelsPerInchD; bitmapWidthInches=bitmapPixelWidthD/pixelsPerInchD; viewpti=bitmapWidthInches/2.0; viewptj=bitmapHeightInches/2.0; viewptk=−11.22; m0=3.3; m1=−2.2; N1i=0.0; N1j=0.0; N1k=−1.0; N0i=0.0; N0j=0.0; N0k=0.0; unsigned int count0=0; unsigned int count1=0; unsigned int count2=0; unsigned int count3=0; double pti=0.0;double ptj=0.0; double ptk=0.0; double testd=0.0; double currentlength=0.0; double priorlength=0.0; double difference1=0.0; unsigned int Indexx=0; double rowD=0.0; double columnD=0.0; unsigned int row=0; unsigned int column=0; unsigned int red=0; unsigned int green=0; unsigned int blue=0; bitmap bitmapx; while(count0<700)< [ptj=m0*pti−4.3; vppti=vpi−pti; vpptj=vpj−ptj; vpptk=vpk− ptk; IntersectVectorWithPlane(intpti, intptj, intptk, vpi, vpj, vpk, pti, ptj, ptk, N1i, N1j, N1k, N0i, N0j, N0k); if(intpti<0.0 or intpti> bitmapWidthInches or intptj<0.0 or intptj> bitmapHeightInches)<[pti+=0.001; count)++; if(count0<700)< [continue; ]> else <[break; ]>]> rowD=ptj*pixelsPerInchD; row=unsigned int(rowD); columnD pti*pixelsPerInchD; column=unsigned int(columnD); Indexx=row*bitmapPixelWidth+column; priorlength=lengthv[Indexx]; currentlength=sqrt (vppti*vppti+vpptj*vpptj+vpptk*vpptk); if(currentlength<priorlength)<[lengthv[Indexx]=currentlength; ]> pti+=0.001; count0++; ]> while(count1<900) <[ptj=m1*pti−2.89; vppti=vpi−pti; vpptj=vpj−ptj; vpptk=vpk−ptk; IntersectVectorWithPlane(intpti, intptj, intptk, vpi, vpj, vpk, pti, ptj, ptk, N1i, N1j, N1k, N0i, N0j, N0k); if(intpti<0.0 or intpti> bitmapWidthInches or intptj<0.0 or intptj> bitmapHeightInches)<[pti+=0.001; count1++; if(count1<900)<[continue; ]> else <[break; ]> ]> rowD=ptj*pixelsPerInchD; row=unsigned int(rowD);

columnD=pti*pixelsPerInchD; column=unsigned int(columnD); Indexx=row*bitmapPixelWidth+column; priorlength=lengthv[Indexx]; currentlength=sqrt(vppti*vppti+vpptj*vpptj+vpptk*vpptk); if(currentlength<priorlength) <[lengthv[Indexx]=currentlength; ]> pti+=0.001; count1++; ]> while(count2<700)<[ptj=m0*pti−4.3; vppti=vpi−pti; vpptj=vpj−ptj; vpptk=vpk−ptk; IntersectVectorWithPlane(intpti, intptj, intptk, vpi, vpj, vpk, pti, ptj, ptk, N1$i$, N1$j$, N1$k$, N0$i$, N0$j$, N0$k$); if(intpti<0.0 or intpti> bitmapWidthInches or intptj<0.0 or intptj> bitmapHeightInches)<[pti+=0.001; count2++; if(count2<700)<[continue; ]> else <[break; ]>]> rowD=ptj*pixelsPerInchD; row=unsigned int(rowD); columnD=pti* pixelsPerInchD; column=unsigned int(columnD); Indexx=row* bitmapPixelWidth+column; priorlength=lengthv[Indexx]; currentlength=sqrt(vppti*vppti+vpptj*vpptj+vpptk*vpptk); difference1=abs(currentlength−priorlength); if(difference1<0.0001)<[pointIsVisible=true; red=240; green=0; blue=0; bitmapx.SetPixel(row, column, red, green, blue); ]> else <[pointIsVisible=false; ]> pti+=0.001; count2++; ]> while(count3<900)<[ptj=m1*pti−2.89; vppti=vpi−pti; vpptj=vpj−ptj; vpptk=vpk−ptk; IntersectVectorWithPlane(intpti, intptj, intptk, vpi, vpj, vpk, pti, ptj, ptk, N1$i$, N1$j$, N1$k$, N0$i$, N0$j$, N0$k$); if(intpti<0.0 or intpti> bitmapWidthInches or intptj<0.0 or intptj> bitmapHeightInches)<[pti+=0.001; count3++; if(count3<900)<[continue; ]> else<[break; ]>]> rowD=ptj*pixelsPerInchD; row=unsigned int(rowD); columnD=pti*pixelsPerInchD; column=unsigned int(columnD); Indexx=row*bitmapPixelWidth+column; priorlength=lengthv[Indexx]; currentlength=sqrt(vppti*vppti+vpptj*vpptj+vpptk*vpptk); difference1=abs(currentlength−priorlength); if(difference1<0.0001)<[pointIsVisible=true; red=0; green=0; blue=250; bitmapx.SetPixel(row, column, red, green, blue); ]> else <[pointIsVisible=false; ]> pti+=0.001; count3++; ]>]>

Figure 8:
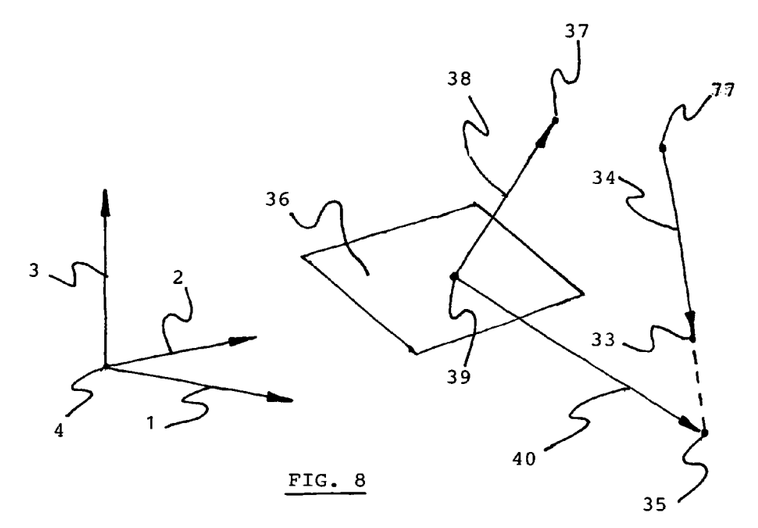
FIG. 8 is a perspective view of a geometric plane (36), a vector (34), and an intersection point (35) of plane (36) with vector (34).

FIG. 8 shows a perspective view of a vector (34) intersecting a plane (36) at point (35). A normal vector (38) of plane (36) is shown. The normal vector is formed by point N0 (39) and point N1 (37). Point N (39) is on plane (36). Vector (34) is formed of any two points, point (77) and point (33). Vector (40) is formed of two points, point (35) and point (39). Vector (40) is in plane (36). The following c++ code shows an example of 'Vector Plane Intersection', and is the function used above. where, intpti, intptj, intptk is intersection point (35); pt1 is point (77); pt0 is point (33); N0 is point (39); N1 is point (37):

c++ <[void IntersectVectorWithPlane(double& intptiP, double& intptjP, double& intptkP, double pt1$i$, double pt1$j$, double pt1$k$, double pt0$i$, double pt0$j$, double pt0$k$, double N1$i$P, double N1$j$P, double N1$k$P, double N0$i$P, double N0$j$P, double N0$k$P)<[double Ni=N1$i$P−N0$i$P; double Nj=N1$j$P−N0$j$P; double Nk=N1$k$P−N0$k$P; double testdenom=abs(pt1$i$−pt0$i$); if(testdenom<1.0e−9)<[return; ]> double mji=(pt1$j$−pt0$j$)/(pt1$i$−pt0$i$); double mki=(pt1$k$−pt0$k$)/(pt1$i$−pt0$i$); testdenom=abs(Ni+Nj*mji+Nk*mki); if(testdenom<1.0e−9)<[return; ]> tempi=(N0$i$P*Ni+Nj*mji*pt0$i$−Nj*pt0$j$+Nj*N0$j$P+Nk*mki*pt0$i$−Nk*pt0$k$+Nk*N0$k$P)/(Ni+Nj*mji+Nk*mki); intptiP=tempi; intptjP=mji*(tempi−pt0$i$)+pt0$j$; intptkP=mki*(tempi−pt0$i$)+pt0$k$; ]>]>

The general formula for intptiP is formed by combining a general formula for a plane with a general formula for a line. More specifically, the projection of a vector to the i-j plane, and the projection of the vector to the i-k plane. The general formula for a plane is set in an equation that any vector in the plane dotted with the planes normal vector is zero. N dot v is zero. where N is the normal vector of the plane, and v is any vector in the plane. A general formula for a line is: j=mji*(i−i0)+j0 where i0, j0, and mji are given. Also, k=mki*(i−i0)+k0 where i0, k0, and mki are given. These two equations for a line are substituted in the equation for a plane; and solved for i. This substitution eliminates variables j and k. Only i remains in the equation. Solving for i yields the equation above in the c++code snippet.

The graphic object structure analysis may also include reflection vectors. A reflection vector can be derived for any point in a graphic object. This reflection vector may intersect any graphic object. e.g. any plane, sphere, or surface. The intersection point can be assigned any selected pixel color. For example, a light source contacts a particular point on a blue surface; a reflection vector is calculated at this particular point; the reflection vector intersects a red sphere; the intersection point is set to blue. The following c++code snippet sets forth an example to calculate a reflection vector.

c++ <[void ReflectionVector(double& rpti, double & rptj, double& rptk, double Ni, double Nj, double Nk, double s1$i$, double s1$j$, double s1$k$, double ai, double aj, double ak)<[double si=s1$i$−ai; double sj=s1$j$−aj; double sk=s1$k$−ak; double lengths=sqrt(si*si+sj*sj+sk*sk); double lengthN=sqrt(Ni*Ni+Nj*Nj+Nk*Nk); double NdotS=(Ni*si+Nj*sj+Nk*sk)/(lengthN*lengths); double testDot=abs(NdotS); if(testDot<1.0e−6)<[return; ]> else if(testDot>0.9999)<[rpti=s1$i$; rptj=s1$j$; rptk=s1$k$; return; ]> double phi=a cos(NdotS); double Nri=0.0; double Nrj=0.0; double Nrk=0.0; double rxi=0.0; double rxj=0.0; double rxk=0.0; double tlen=2.0*lengths*sin(phi); Nri=Nj*sk−sj*Nk; Nrj=−(Ni*sk−si*Nk); Nrk=Ni*sj−si*Nj; rxi=Nj*Nrk−Nrj*Nk; rxj=−(Ni*Nrk−Nri*Nk); rxk=Ni*Nrj−Nri*Nj; double lengthrx=sqrt(rxi*rxi+rxj*rxj+rxk*rxk); if(lengthrx>1.0e−6)<[cx=tlen/lengthrx; ]> else <[return; ]> double tri=cx*rxi; double trj=cx*rxj; double trk=cx*rxk; rpti=s1$i$+tri; rptj=s1$j$+trj; rptk=s1$k$+trk; ]>]>

In the above example for the reflection vector, The tail end of the reflection vector is ai, aj, ak; the terminal end of the reflection vector is rpti, rptj, rptk. The reflection vector is: (rpti−ai)i+(rptj−aj)j+(rptk−ak)k; ai, aj, ak, the intersection point of a light source vector with the plane. Ni, Nj, Nk is the normal vector of the plane.

A graphic object structure may also include translucent surfaces. A translucent surface can be derived by intersecting a vector with one or more surfaces. Next, set the selected pixel color at a relatively less pixel per inch resolution. For example, for a bitmap having a resolution of 1000 pixels per inch, a translucent surface can be attained by setting a background image at about 500 pixels per inch. For example, a foreground rectangular translucent blue surface; and a background linear red surface; initially all pixels in the bitmat are blue; Next, the program iterates thru the equation of the line; and assign a red pixel at a density of 500 pixels per inch.

One method to create a translucent surface is using a 'next least length' concept. This concept is related to a 'visible' point on the geometric object. Opaque surfaces described above, have only one point per steradian which is 'visible'. In comparison, for a translucent surface, there may be to or three or more points in one particular steradian which are 'visible'. e.g. the visible points are 2 points having the least position vector length. The following is an example c++ code snippet showing a method to calculate a translucent surface:

The following is a summary of c++ code for translucent surface calculation: This code may be set in line with the above c++ code examples; c++ <vector> priorLength0, <vector> priorLength1, and <vector> priorLength2 contain values having a respective next least length; for example, at index 33, priorLength0[33]==22.15; priorLength1[33]==28.76; prior- Length2[33]==30.85; first, a current position vector length is calculated; read priorLength0, priorLenght1, and priorLength2; calculate 3 test values, test if currentLength is the first least value; if true: shift existing values to next vector; and assign currentLength to priorLength0; else test if currentLength is the second least value; if true: shift existing values to next vector; and assign currentLength to priorLength1; else test if currentLength is the third least value; if true: assign currentLength to priorLength2; repeat steps above for each graphic object point; Next loop: calculate currentLength; read priorLength0, priorLength1, and priorLength2; calculate 3 test values, the difference between respective length; test if currentLength is the first least length; if true: set IsFirstSurface=true; else test if currentLength is the second least length; if true: set IsSecondSurface=true; else test if currentLength is the third least length; if true: set IsThirdSurface=true; repeat for each point in the geometric objects.

currentLength=23.33; pLength0=priorLength0[indexx]; pLength1=priorLength1[indexx]; pLength2=priorLength2[indexx]; testd0=abs(currentLength−pLength0); testd1=abs(currentLength−pLength1); testd2=abs(currentLength−pLength2); if(currentLength<pLength0 && testd0>1.0e−5)<[priorLength1[indexx]=pLength0; priorLength2[indexx]=pLength1; priorLength0[indexx]=currentLength; ]> else if(currentLength<pLength1 && testd1>1.0e−5)<[priorLength1[indexx]=currentLength; priorLength2[indexx]=pLength1; ]> else if(currentLength<pLength2 && testd2>1.0e−5)<[priorLength2[indexx]=currentLength; ]>]>//next loop <[ pLength0=priorLength0[indexx]; pLength1=priorLength1[indexx]; pLength2=priorLength2[indexx]; currentLenght=34.57; testd0=abs(currentLength−pLength0); testd1=abs(currentLength−pLength1); testd2=abs(currentLength−pLength2); if(testd0<1.0e−5)<[IsFirstSurface=true; ]> else if(testd1<1.0e−5)<[IsSecondSurface=true; ]> else if(testd2<1.0e−5)<[IsThirdSurface=true; ]>]>

Calculating a Position Vector of a Geometric Structure

FIG. 3 shows an example of a position vector (23). Position vector (23) points to a geometric object (27). The tail end of position vector (23) is at origin (4). Therefore, the following c++ code snippet shows an example of calculating a position vector of a geometric structure:

c++ <[pti=3.3; ptk=7.8; ptj=7.65*pti+6.48; ]> The calculations of pti, ptj, and ptk above creates a position vector (23) equal to 3.3$i$+31.725$j$+7.8$k$ Calculating a Particular Steradian Region of Space FIG. 1 shows an example of a particular steradian (5). The following c++ code snippet shows an example of calculating a particular steradian region of space:

c++ <[AdotB=(ai*bi+aj*bj+ak*bk)/(lengthA*lengthB); theta=a cos(AdotB); arcLength=steradianRadius*theta; columnIndex=arcLenght/0.001; AdotB=(ai*di+aj*dj+ak*dk)/(lengthA*lengthD); theta=a cos(AdotB); arcLength=steradianRadius*theta; rowIndex=arcLength/0.001; ]> where 'a' is a position vector (23); 'b' is a vector (17); 'd' is the k axis vector; the value 0.001 declares that the steradian arc width is 0.001 inches; steradian arc width, and steradian radius are both selected to be any suitable value. 'steradian radius' is the length of vector (17); 'theta' is the angle between position vector (23) and vector (17); 'arcLength' is the length of arc (48); 'AdotB' is the vector dot product of position vector (23) and vector (17); next, 'AdotB' is the vector dot product of position vector (23) and the k axis vector; This example calculates that the particular steradian region of space is located at 'rowIndex' and 'columnIndex', and has a steradian arc width of 0.001 inches. FIG. 1 shows an example of the boundary of this particular steradian region of space.

The Position Vector is Located in One Particular Steradian Region of Space

A steradian may be located in any selected region of space. FIG. 5 shows an initial side vector (17), and terminal side vector (21) of adjacent steradians (16). Vector (17) and vector (21) may be at any selected location. Both the steradian and position vector have the property of direction and scalar length. Furthermore, both a steradian and position vector originates from the origin (4). These properties of direction and location show that a position vector is located in one particular steradian region of space. A position vector (23) is located between 4 boundary vectors of the steradian (16).

FIG. 6 shows an example of two position vectors located in one particular steradiane region of space. Both position vector (23) and position vector (24) are located between the four boundary vectors of steradian (22). FIG. 1 shows an example of one particular steradian (5); and the boundary vector (6), boundary vector (7), boundary vector (8), and boundary vector (9).

Calculating a Length of a Position Vector

The following c++ code snippet shows an example of calculating a length of a position vector:

c++ <[currentLength=sqrt(pti*pti+ptj*ptj+ptk*ptk); ]> where pti, ptj, ptk are the coordinates of the position vector, and currentLength is the length of the position vector.

Comparing a First Position Vector Length to a Second Position Vector Length

The following c++ code snippet shows an example of Comparing a First Position Vector Length to a Second Position Vector Length:

c++ <[if(currentLength<priorLength)]> where currentLength is a first position vector length; and priorLength is a second position vector length. The result of this comparison is boolean true or false.

Deriving a Pixel Color From a Result of the Position Vector Length Comparison

A fundamental component of the present invention is shown in FIG. 6: Two position vectors both located in one particular steradian region of space. The length of these two position vectors is compared; and a result of the comparison is either true or false. The position vector having a least length has contact with a light source. This result of least length provides that the program can set an appropriate pixel color accordingly. Obviously, variations of the pixel color may be attained by additional steps not shown herein. The following c++ code snippet shows an example of deriving a pixel color from a result of position vector length comparison:

c++ <[currentLenght=28.75; priorLength=48.62; if(currentLength<priorLength)< [sourceContactSurface=true; red=255; green=0; blue=0; bitmapx.SetPixel(row, column, red, green, blue); ]>else <[sourceContactSurface=false; red=11; green=10; blue=22; bitmapx.SetPixel(row, column, red, green, blue); ]>]>

The values of 'red', 'green', and 'blue' color assigned above are dependent on the result of the boolean comparison 'if(currentLength <priorLength)'; Therefore, the color (red, green, blue) above is derived from the result of the boolean comparison.

The best mode for using the present invention is set forth in the description above, and the appended drawings.

The industrial applicability of the present invention includes creating 3-dimensional graphic effects in any graphic image. for example, reflective images, highlights, shadows, translucent surfaces. e.g. electronic bitmaps, RGB 48 bpp bitmap.

The description above sets forth specific examples of the present invention. Obviously, many variations of the present invention are possible. Therefore, limitations should only be imposed as those set forth in the appended claims.

I claim:

1. A method for deriving a pixel color comprising the steps of:
a computer calculating a first position vector for a geometric graphic object;
a computer calculating a particular steradian region of space;
a computer calculating a particular steradian radius of said steradian region of space;
a computer calculating that said first position vector is located in said particular steradian region of space;
a computer calculating a second position vector for a geometric graphic object;
a computer calculating that said second position vector is located in said particular steradian region of space;
a computer calculating a length of said first position vector;
a computer calculating a length of said second position vector;
a computer comparing said first length to said second length;
for a first pixel, a computer deriving a pixel color for said first position vector from a result of said length comparison;
for a second pixel, a computer deriving a pixel color for said second position vector from a result of said length comparison.

2. The method for deriving a pixel color according to claim 1 where said result is said first length is less than said second length; and said first pixel is a highlight point; and said second pixel is a shadow point.

3. The method for deriving a pixel color according to claim 1 where said computer is an electronic computer.

4. The method for deriving a pixel color according to claim 1 further including, a computer calculating a particular rotation angle position of said steradian region of space;
a computer calculating a particular azimuth angle position of said steradian region of space.

5. The method for deriving a pixel color according to claim 4 further including, a computer calculating a steradian row index derived from said azimuth angle and said steradian radius; and a computer calculating a steradian column index derived from said rotation angle and said steradian radius.

6. The method for deriving a pixel color according to claim 5 where said rotation angle is in an i j axis plane of a coordinate system; and said azimuth angle is from a k axis of said coordinate system.

* * * * *